July 6, 1954        G. W. ONKSEN        2,682,807
SIGNAL REFLECTOR
Filed Dec. 10, 1949
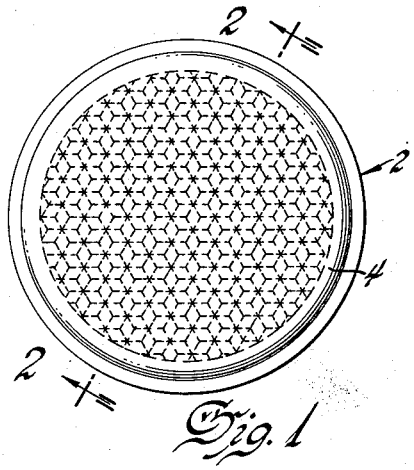
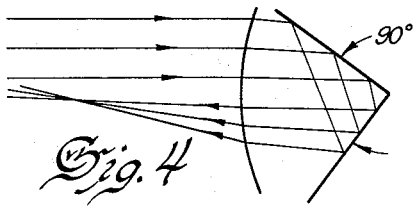
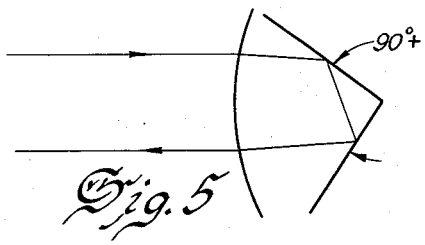
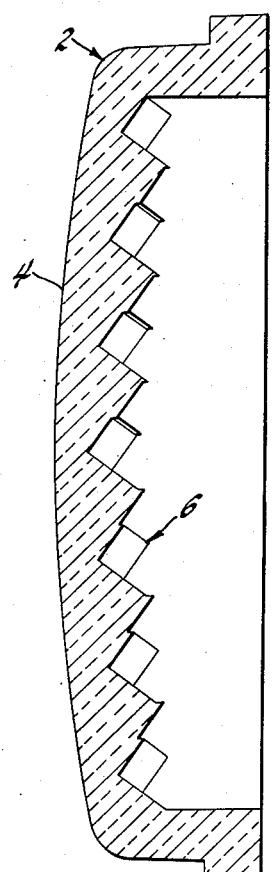
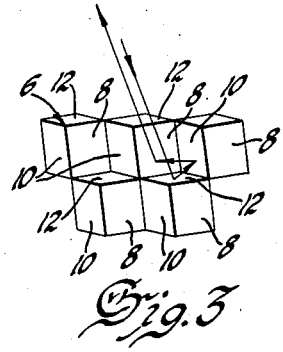
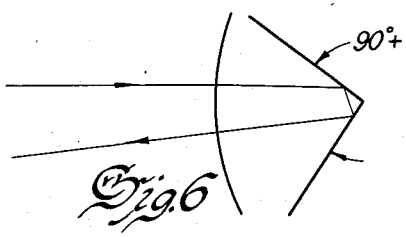
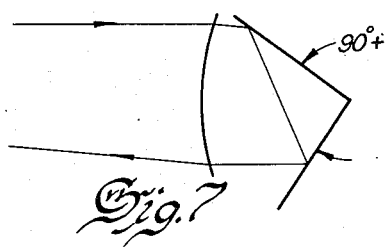
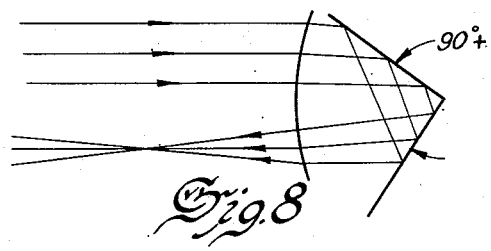
Inventor
George W. Onksen
By
Willits, Helwig & Baillio
Attorneys

Patented July 6, 1954

2,682,807

UNITED STATES PATENT OFFICE 2,682,807

SIGNAL REFLECTOR

George W. Onksen, Anderson, Ind., assignor to General Motors Corporation, Detroit, Mich., a corporation of Delaware Application December 10, 1949, Serial No. 132,383

3 Claims. (Cl. 88—78)

The present invention relates to light reflectors and more particularly to light reflecting devices adapted to reflect light impinging thereon back along a path substantially in the direction of the light source.

A reflecting device which has been used extensively heretofore as a warning signal device for vehicles and highway obstructions and markers comprises a matrix of contiguous merging similarly oriented cube corner reflecting units consisting of three substantially plane surfaces in the form of squares arranged to intersect at a common point with the adjacent surfaces at right angles to each other and with the axis of the device parallel to the diagonal axes of the reflecting units. Such a reflecting device is disclosed in the Stimson Patent Number 1,848,675, dated March 8, 1932.

It is a characteristic of a reflecting device of this type that a light ray incident on one of the surfaces of the cube corner reflecting units is reflected from surface to surface around the diagonal axis of the units and back along a path parallel to the incident ray. It is common practice in the manufacture of reflecting devices having a matrix of such reflecting units to form the matrix on one surface of a heat softened transparent glass or plastic by the impression in the glass or plastic of a die consisting of a cluster of hexagonal rods or bars having cube corners formed on the ends of each of the adjacent rods or bars in the cluster. Where a matrix of such reflecting units is formed with the apices of the cube corners aligned spherically it will be apparent that in forming a die to provide such an alignment, the cube corner ends on the rods will be displaced longitudinally of the cluster with gradually increasing amounts of displacement from the center of the cluster radially outwardly to the peripheral edge of the cluster. Consequently in a matrix of cube corners formed by such a die the reflecting surfaces of adjacent cube corner reflecting units will axially overlap in increasing amounts from the center outwardly. This results in masking areas of the reflecting surfaces from reflected light and a non-uniform reflection efficiency across the reflecting matrix. Further where such a matrix is formed on the inner surface of a transparent body having an outer spherical surface there is an undesirable dispersion of reflected light caused by refraction of the light rays as they enter and leave the outer surface of the reflecting device. Consequently the intensity of the reflected beam of light is reduced.

It is therefore an object of the present invention to provide such a reflecting device having uniform efficiency of reflection and optimum reflection intensity.

This and other objects are attained in accordance with the present invention by providing a reflecting device having a matrix of substantially cube corner reflecting units the apices of the cube corner units being aligned conically to obtain a uniform efficiency of reflection and the adjacent reflecting surfaces of the units being angularly displaced to compensate for outer surface refraction and obtain optimum reflection intensity.

For a better understanding of the invention reference may be had to the accompanying drawing in which Figure 1 is a front elevation view of a reflecting device embodying the present invention; Figure 2 is an enlarged cross-sectional view taken on line 2—2 of Figure 1; Figure 3 is an enlarged perspective view of a cluster of cube corner units such as form the reflecting surface of the device and Figures 4 through 8 inclusive are optical diagrams.

Referring now to the drawing and particularly to Figures 1, 2 and 3 there is illustrated a body of transparent material in the form of a disk 2 of substantially uniform thickness and having an outer spherical surface 4 and an inner reflecting surface comprising a matrix of similarly oriented merging substantially cube corner reflecting units 6 comprising three adjacent substantially square surfaces 8, 10 and 12 meeting at a common point with the diagonal axis of the cube corner units parallel with the axis of the disk. The disk 2 is made of a transparent material such, for example, as glass or preferably the thermoplastic methyl-methacrylate resin commonly known as "Lucite" and is colored red to provide the commonly used warning signal color.

In accordance with the present invention uniform reflection efficiency across the inner surface reflecting area is obtained by forming the matrix of cube corner reflecting units 6 with the cube corner aperture apices aligned conically across the disk as illustrated in Figure 2. This is accomplished by the impression in the heat softened glass or plastic disk 2 of a die consisting of a plurality of clustered hexagonal rods or bars having cube corners formed on the ends with the apices of the cube corners aligned on a conical surface having a suitable cone angle. With such an alignment of the apices of the die cube corners a uniform axial displacement of the cube corner ends is obtained in the cluster and is likewise transferred to the disk 2 resulting in uniformly masked areas across the matrix and a corresponding uniform reflection efficiency from each of the reflecting units forming the matrix.

Further, in accordance with the present invention optimum reflection efficiency is obtained by displacing the merging adjacent reflecting surfaces of the cube corner units at an angle in excess of the right angle displacement of the geometric cube corner to compensate for refraction at the spherical surface and provide parallelism between an incident and reflected ray entering and returning from the spherical surface after impinging on one of the reflecting surfaces and being reflected in turn from that surface and the mid point of the edge formed by the merging of the oppositely disposed two reflecting surfaces. The path of such a ray of light is illustrated in the optics diagram of Figure 5 and will be explained in more detail hereinafter. In this connection I have found that the correction angle in excess of the right angle or 90 degree displacement to provide such parallelism is obtained by the following formula:

$$\beta = \frac{1}{6} \sin^{-1}\left(\frac{D}{4R}\right)$$

where $\beta$ is the correction angle to be added to 90 degrees to determine angular displacement between reflecting surfaces.

D is the distance across diagonally opposed corners of the cube corner unit measured in a plane perpendicular to that diagonal of the unit which is substantially parallel with the central axis of the disk.

R is the radius of curvature of the outer surface.

In computing the correction angle $\beta$ which is to be added to 90 degrees, D, as defined above, corresponds to the distance between opposed edges of the hexagonal rod on which the cube corner is formed measured perpendicularly to the longitudinal axis of the rod. In other words, it is the greatest cross-sectional dimension of the hexagonal rod. Consequently in a reflecting device such as I have described having a reflecting surface comprising a matrix of cube corners formed with a die consisting of a cluster of hexagonal rods or bars having, for example, a cross-sectional dimension of .0936 inch between sides and .108 inch between edges, D in the formula becomes .108 and the radius of curvature of the outer surface 4 being, for example 3 inches, R in the formula becomes 3. Solving for the angle of correction it is calculated to be 0 degree 5.17 minutes which when added to 90 degrees determines the angle of displacement between reflecting sides at 90 degrees, 5.17 minutes. With such a curvature and angular displacement a ray of light entering the device for incidence on one of the reflecting surfaces between the point of incidence on the reflecting surfaces for parallelism and the apex of the cube corner is returned along a path diverging from the incident ray as illustrated in Figure 6. Likewise with such a curvature and angular displacement a ray of light entering the device for incidence on one of the surfaces between the point of incidence for parallelism and the outer corner of the device is returned along a path converging on the incident ray as illustrated in Figure 7. Figure 8 illustrates in one reflecting unit the paths of the three rays of light illustrated in Figures 5, 6 and 7. Figure 4 illustrates the paths of a plurality of rays incident on and reflected from a cube corner unit having a 90 degree angular displacement between adjacent sides which has been the angle of displacement utilized with reflecting units of the cube corner type heretofore. All of the Figures 5 through 7 inclusive are illustrative of the cross section of a cube corner reflecting unit taken along a plane bisecting one surface of the unit and the oppositely disposed edge formed by the merging of the remaining reflecting surfaces.

With a device such as I have described it will be apparent that angular displacement between a light ray incident on the device and reflected therefrom is substantially reduced. Consequently a beam of light reflected therefrom has an optimum intensity for signaling purposes. With a device such as I have described having the reflecting surfaces of the substantially cube corner units angularly spaced to compensate for refraction at the incident surface of the device I have found that the intensity of the reflected beam is substantially four times greater than the intensity of a beam reflected from a similar device in which the angular displacement between reflecting surfaces is 90 degrees.

What I claim as new and desire to secure by Letters Patent of the United States is:

1. A reflection signaling device comprising a disk of transparent material having a curved outer surface and an inner surface comprising a matrix of contiguous substantially cube corner units with each unit consisting of a series of substantially square reflecting surfaces arranged to meet at a common point with a diagonal axis of the unit substantially parallel with the central axis of the disk, said reflecting surfaces being disposed at an angle to each other of about 90 degrees varied by a correction angle $\beta$ to cause reflection of a ray of light incident on the curved surface and at a predetermined point on one of the reflecting surfaces back along a path outside the device substantially parallel to the path of the incident ray, said correction angle $\beta$ being determined by the formula $$\beta = \frac{1}{6} \sin^{-1}\left(\frac{D}{4R}\right)$$

where D is the distance between opposed corners of one of said cube corner units measured in a plane perpendicular to the diagonal axis of said unit and R is the radius of curvature of said curved outer surface.

2. A reflection signaling device comprising a disk of transparent material having a convexly curved outer surface and an inner surface comprising a matrix of contiguous substantially cube corner units, each unit consisting of a series of substantially square reflecting surfaces arranged to meet at a common point with the diagonal axis of the unit substantially parallel with the central axis of the disk, said reflecting surfaces being disposed to each other at an angle of 90 degrees plus a correction angle $\beta$ to cause reflection of a ray of light incident on the curved surface and at a predetermined point on one of the reflecting surfaces back along a path outside of the device substantially parallel to the path of the incident ray, said correction angle $\beta$ being determined by the formula $$\beta = \frac{1}{6} \sin^{-1}\left(\frac{D}{4R}\right)$$

where D is the distance between opposed corners of one of said cube corner units measured in a plane perpendicular to the diagonal axis of said unit and R is the radius of curvature of said convexly curved outer surface.

3. A reflection signaling device comprising a disk of transparent material having a curved outer surface and an inner surface comprising a matrix of contiguous substantially cube corner units having their apices aligned conically, each of said units consisting of a series of substantially square reflecting surfaces arranged to meet at a common point with the diagonal axis of the unit substantially parallel with the central axis of the disk, said reflecting surfaces being disposed to each other at an angle of about 90 degrees varied by a correction angle $\beta$ to cause reflection of a ray of light incident on the curved surface and at a predetermined point on one of the reflecting surfaces back along a path outside of the device substantially parallel to the path of the incident ray, said correction angle $\beta$ being determined by the formula $$\beta = \frac{1}{6} \sin^{-1}\left(\frac{D}{4R}\right)$$

where D is the distance between opposed corners of one of said cube corner units measured in a plane perpendicular to the diagonal axis of said unit and R is the radius of curvature of said convexly curved outer surface.

References Cited in the file of this patent

UNITED STATES PATENTS

| Number | Name | Date |
|---|---|---|
| 1,807,350 | Stimson | May 26, 1931 |
| 1,906,504 | Allison | May 2, 1933 |
| 2,337,167 | Patton | Dec. 21, 1943 |
| 2,432,810 | Ryder | Dec. 16, 1947 |